Patented Oct. 14, 1930

1,778,240

UNITED STATES PATENT OFFICE

WALLACE J. YATES, OF MARTINEZ, CALIFORNIA, ASSIGNOR TO SHELL DEVELOPMENT COMPANY, OF SAN FRANCISCO, CALIFORNIA, A CORPORATION OF DELAWARE

SPRAY OILS

No Drawing.   Application filed May 15, 1929.   Serial No. 363,406.

My invention consists in improving spray oils used as insecticides by the addition of small quantities of hydroquinone to prevent injury to the vegetation.

I have observed that spray oils, as commonly used for the protection of plants and trees, particularly fruit trees against certain insects, very often cause injury to the vegetation, especially with the less refined oils; twig injury, leaf burn, fruit burn, increase of fruit or leaf drop and crop reduction often follow the spraying with insecticidal oils.

I have found that the addition of small amounts of hydroquinone to the oil before the spraying will usually prevent, or in any case, reduce this injury, as well with summer or foliage spray oils, as will less refined winter or dormant oils. Hydroquinone itself, as well as its chlor substituted compounds (chlorhydroquinone and dichlorhydroquinone) can be used for the purpose of my invention. The addition hereof according to my invention can be used either to increase the safety of a given oil, or for reducing the degree of refinement formerly necessary to spray certain plants with safety; it does not affect the insecticidal value of the oil.

Hydroquinone and its chlor derivatives are almost insoluble in mineral oil; however, the trace dissolving is sufficient to change the behavior of the oil. In view of the small solubility of hydroquinone it is preferable to use a saturated solution.

Preferably, I dissolve them in the oil, before preparing the spray oil emulsion in water. They do not have to be absolutely pure, the commercial product is sufficient for my purpose.

I have further found that hydroquinone and its derivatives mentioned also reduce the injury caused by the addition of nicotine and similar insecticidal substances to the spray oil; such oils with added nicotine cause injury, similar to that caused by the same oil without the addition of nicotine, but to a greater extent, and this increased injury is also counteracted by my invention.

I claim as my invention:

1. An improved spray oil, comprising a small quantity of hydroquinone.

2. As an insecticidal substance, a petroleum spray oil, in which a small quantity of hydroquinone has been dissolved.

3. A spraying liquid for insecticidal purposes: an emulsion in water of a petroleum spray oil to which a small quantity of hydroquinone has been added.

4. An improved spray oil, comprising: a concentrated solution of hydroquinone in a mineral spray oil.

5. A process for preventing injury to vegetation from petroleum spray oil, comprising: adding to the oil before the spraying a small quantity of hydroquinone.

6. A process for improving a spray oil in which nicotine has been incorporated, comprising: adding to the oil before the spraying a small quantity of hydroquinone.

7. An improved spray oil, comprising: a small quantity of a chlor-substituted derivative of hydroquinone.

8. An improved spray oil, comprising: a concentrated solution of a chlorinated derivative of hydroquinone in a mineral spray oil.

In testimony whereof, I have hereunto set my hand.

WALLACE J. YATES.